United States Patent
Abraham (10) Patent No.: US 9,322,924 B2
(45) Date of Patent: Apr. 26, 2016

(54) METHOD AND SYSTEM FOR POWER MANAGEMENT FOR A FREQUENCY SYNTHESIZER IN A GNSS RECEIVER CHIP

(75) Inventor: Charles Abraham, Los Gatos, CA (US)

(73) Assignee: Broadcom Corporation, Irvine, CA (US)

( * ) Notice: Subject to any disclaimer, the term of this patent is extended or adjusted under 35 U.S.C. 154(b) by 782 days.

(21) Appl. No.: 12/352,346

(22) Filed: Jan. 12, 2009

(65) Prior Publication Data

US 2010/0149033 A1 Jun. 17, 2010

Related U.S. Application Data

(60) Provisional application No. 61/122,097, filed on Dec. 12, 2008.

(51) Int. Cl.
*G01S 19/34* (2010.01)
(52) U.S. Cl.
CPC ................................ *G01S 19/34* (2013.01)
(58) Field of Classification Search
USPC ......................... 342/357.74, 357.76, 357.62
IPC ................................ G01S 19/34,19/36, 19/235
See application file for complete search history.

(56) References Cited

U.S. PATENT DOCUMENTS

| | | | | |
|---|---|---|---|---|
| 5,883,594 | A * | 3/1999 | Lau | 342/357.63 |
| 6,133,871 | A * | 10/2000 | Krasner | 342/357.74 |
| 6,448,927 | B1 * | 9/2002 | Ishigaki et al. | 342/357.31 |
| 2004/0252052 | A1 * | 12/2004 | Kitatani | 342/357.12 |
| 2005/0200520 | A1 * | 9/2005 | Jesson | 342/357.07 |
| 2005/0280576 | A1 * | 12/2005 | Shemesh et al. | 342/357.1 |
| 2007/0152876 | A1 * | 7/2007 | Wang et al. | 342/357.02 |
| 2008/0150797 | A1 * | 6/2008 | Jia et al. | 342/357.06 |
| 2008/0303601 | A1 * | 12/2008 | Young | 331/66 |

(Continued)

FOREIGN PATENT DOCUMENTS

WO WO 2006/010976 A1 * 2/2006

OTHER PUBLICATIONS

J. Ashjaee, GPS: The Challenge of a Single Chip, GPS World, p. 24-27, May 2001.*

(Continued)

*Primary Examiner* — Tashiana Adams
*Assistant Examiner* — Fred H Mull
(74) *Attorney, Agent, or Firm* — Sterne, Kessler, Goldstein & Fox P.L.L.C.

(57) ABSTRACT

A frequency synthesizer in a GNSS receiver chip enables duty cycling operation of the frequency synthesizer. The frequency synthesizer is cycled on to generate required clock signals for the GNSS receiver chip, and cycled off during a measurement duty cycle comprising measurement available intervals and measurement unavailable intervals. A reference clock inputted to the frequency synthesizer is on during the measurement duty-cycle. During the measurement available intervals, the frequency synthesizer is cycled on to generate the required clock based on the reference clock. During the measurement unavailable intervals, the frequency synthesizer is cycled off and clock timing is maintained based on the reference clock. A number of elapsed clock cycles of the reference clock is captured for a measurement unavailable interval and transferred to a clock offset. The GNSS receiver chip processes signals received using the required clock and the clock offset in a following measurement available interval.

22 Claims, 4 Drawing Sheets

(56) References Cited

U.S. PATENT DOCUMENTS

2009/0058719 A1* 3/2009 Huang et al. .............. 342/357.1
2009/0224974 A1* 9/2009 Lorenz .................... 342/357.12

OTHER PUBLICATIONS

Motorola unveils latest in family of single chip GPS devices, PR Newswire Europe, Sep. 2002.*

A.J. Dierendonck, GPS Receiver, in B.W. Parkinson et al., Global Positioning System: Theory and Applications, vol. 1; Progress in Astronautics and Aeronautics, vol. 163, American Institute of Aeronautics and Astronautics, Inc., p. 329-334, 1996.*

B.W. Parkinson et al., Global Positioning System: Theory and Applications, vol. 1; Progress in Astronautics and Aeronautics, vol. 163, American Institute of Aeronautics and Astronautics, Inc., p. 329-334, 1996.*

Maxim Integrated Products Licenses Parthus NavStream GPS rF Multi-Chip to Enable Unrivalled Location Accuracy for Mobile-Internet Devices, Business-Wire, Sep. 2000.*

L. Wilz et al., A highly integrated, versatile GPS receiver for E911 applications, IEEE Radio Frequency Integrated Circuits (RFIC) Symposium, Jun. 2002.*

T. Kadoyama et al., A complete single-chip GPS receiver with 1.6-V 24-mW radio in 0.18-μm CMOS, IEEE Journal of Solid-State Circuits, vol. 39(4), Apr. 2004.*

P.G. Mattos, A Single-Chip GPS Receiver and the Steps to Mass-Market Galileo, GPS World, Oct. 2005.*

Crystal Oscillator (XO). (2001). In F. Hargrave, Hargrave's Communications Dictionary, Wiley. Hoboken, NJ: Wiley. Retrieved from http://search.credoreference.com/content/entry/hargravecomms/crystal_oscillator_xo/0.*

Convey. (2011). The American Heritage Dictionary of the English Language. Boston, MA: Houghton Mifflin. Retrieved from http://search.credoreference.com/content/entry/hmdictenglang/convey/0.*

Ftp. (2011). The American Heritage Dictionary of the English Language. Boston, MA: Houghton Mifflin. Retrieved from http://search.credoreference.com/content/entry/hmdictenglang/ftp/0.*

HTTP or http. (2011). The American Heritage Dictionary of the English Language. Boston, MA: Houghton Mifflin. Retrieved from http://search.credoreference.com/content/entry/hmdictenglang/http_or_http/0.*

Transfer. (2011). The American Heritage Dictionary of the English Language. Boston, MA: Houghton Mifflin. Retrieved from http://search.credoreference.com/content/entry/hmdictenglang/transfer/0.*

* cited by examiner

METHOD AND SYSTEM FOR POWER MANAGEMENT FOR A FREQUENCY SYNTHESIZER IN A GNSS RECEIVER CHIP

CROSS-REFERENCE TO RELATED APPLICATIONS/INCORPORATION BY REFERENCE

This patent application makes reference to, claims priority to and claims benefit from U.S. Provisional Patent Application Ser. No. 61/122,097 filed on Dec. 12, 2008.

The above state application is hereby incorporated herein by reference in its entirety.

FIELD OF THE INVENTION

Certain embodiments of the invention relate to communication systems. More specifically, certain embodiments of the invention relate to a method and system for power management for a frequency synthesizer in a GNSS receiver chip.

BACKGROUND OF THE INVENTION

The Global Positioning System (GPS), the Global Orbiting Navigation Satellite System (GLONASS), and the satellite navigation system GALILEO are three examples of Global Navigation Satellite Systems (GNSSs). GNSS is based on an earth-orbiting constellation of a plurality of satellites each broadcasting its precise location and ranging information. From any location on or near the earth, GNSS receivers may normally determine their navigation information by receiving satellite broadcast signals from a plurality of satellites. Various GNSS measurements such as pseudorange, carrier phase, and/or Doppler may be used by GNSS receivers to calculate navigation information such as GNSS receiver positions, velocity, and time.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or system for power management for a frequency synthesizer in a GNSS receiver chip, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for power management for a frequency synthesizer in a GNSS receiver chip. Various embodiments of the invention may comprise duty cycling the operation of a frequency synthesizer within a GNSS RF front-end of a GNSS receiver chip, wherein the frequency synthesizer is cycled on to generate required clock signals and cycled off during a measurement duty cycle. The frequency synthesizer may be used to generate a required clock for the GNSS receiver chip. The measurement duty-cycle may comprise a plurality of measurement available intervals and a plurality of measurement unavailable intervals, respectively. A source clock may generate a reference clock, which is provided as an input to the frequency synthesizer. The source clock may keep the reference clock on during the entire measurement duty-cycle. The frequency synthesizer may be turned on to generate the required clock to a GNSS baseband for the GNSS receiver chip during the plurality of measurement available intervals. The required clock may be generated based on the reference clock from the source clock.

The RF front-end and the GNSS baseband may be operable to process signals received using the required clock during the plurality of measurement available intervals. The frequency synthesizer may be turned off during the plurality of measurement unavailable intervals and no required clock is provided to the GNSS baseband for the same time period. During the plurality of measurement unavailable intervals, a clock timing control circuit may be enabled to maintain clock timing of the required clock based on the reference clock from the source clock. The clock timing control circuit may be enabled to capture or count number of elapsed clock cycles of the reference clock for a measurement unavailable interval of the measurement duty cycle. The clock timing control circuit may be operable to transfer the captured or counted number of elapsed clock cycles of the reference clock to a clock offset. When the frequency synthesizer is turned back on in a following measurement available interval of the measurement duty cycle, the GNSS baseband processes signals received using the required clock generated by the frequency synthesizer and the clock offset from the clock timing control circuit, accordingly.

Figure 1:
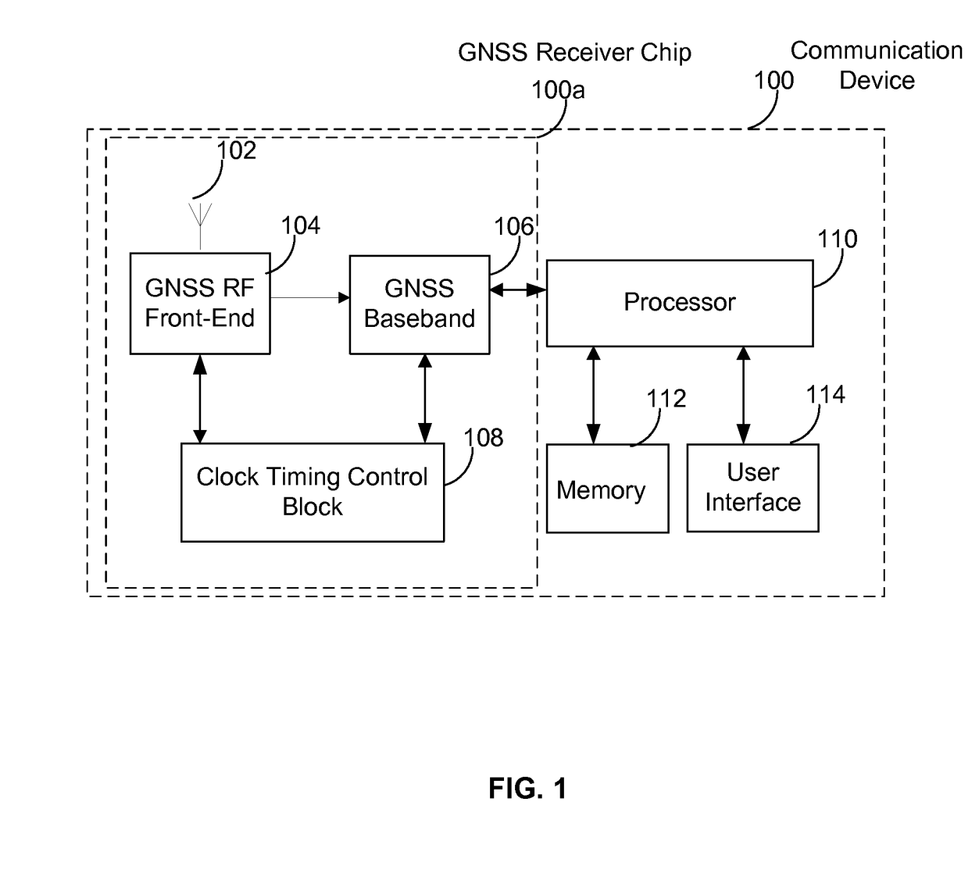
FIG. 1 is a block diagram illustrating an exemplary communication device that enables power management for a frequency synthesizer in a GNSS receiver chip, in accordance with an embodiment of the invention.

FIG. 1 is a block diagram illustrating an exemplary communication device that enables power management for a frequency synthesizer in a GNSS receiver chip, in accordance with an embodiment of the invention. Referring to FIG. 1, there is shown a communication device 100 comprising a GNSS receiver chip 100a, a processor 110, a memory 112, and a user interface 114. The GNSS receiver chip 100a comprises an antenna 102, a GNSS radio frequency (RF) front-end 104, a GNSS baseband 106, and a clock timing control circuit 108.

The GNSS receiver chip 100a may comprise suitable logic, circuitry and/or code that are operable to track and receive GNSS signals. The GNSS receiver chip 100a may be enabled to decode and process the received GNSS signals.

The antenna 102 may comprise suitable logic, circuitry and/or code that are operable to receive various satellite signals from a plurality of satellites and communicate with the GNSS RF front-end 104 for further RF processing.

The RF front-end 104 may comprise suitable logic, circuitry and/or code that enable receiving GNSS signals and converting the received GNSS signals into GNSS baseband signals. The RF front-end 104 may be operable to communicate the converted GNSS baseband signals together with corresponding clock information to the GNSS baseband 106 for further GNSS baseband processing. The RF front-end 104 is operable to maintain a low noise figure to achieve high sensitivity, while minimizing power consumption for battery operated devices such as a cellular telephone. The RF front-end may comprise a cascade structure comprising various RF components such as, for example, a low-noise amplifier (LNA), mixer, a frequency synthesizer, and/or power amplifiers. In this regard, the RF front-end 104 may be configured to operate intermittently to reduce power consumption of the communication device 100. The RF front-end 104 may be enabled to power down or wake up some RF components such as the frequency synthesizer based on operation status of the GNSS baseband 106 within a measurement duty-cycle. The measurement duty-cycle may comprise a plurality of measurement available intervals and a plurality of measurement unavailable intervals. A measurement available interval may represent a time interval during which the GNSS receiver chip 100a may enable operation of the GNSS baseband 106 for requested functions such as, for example, calculating a position fix associated with the communication device 100. A measurement unavailable interval may represent a time interval during which the communication device 100 may have no request made to the GNSS baseband 106. In this regard, components that are not required may remain powered off or in a low power consumption mode. For example, the RF front-end 104 may be operable to provide a required clock via the frequency synthesizer to the GNSS baseband 106 during a measurement available interval. The RF front-end 104 may be operable to shut down the frequency synthesizer in a measurement unavailable interval when the frequency synthesizer is not being utilized. In this regard, no required clock may be provided to the GNSS baseband 106 during this latter measurement unavailable interval.

The GNSS baseband 106 may comprise suitable logic, circuitry and/or code that are operable to process GNSS baseband signals from the RF front-end 104 to extract the information and data bits conveyed in the received signal. The GNSS baseband 106 may be operable to perform functions such as clock recovery, channel selection, demodulation, and/or decoding. To reduce the battery consumption and extend battery life, the GNSS baseband 106 may be configured to operate in a measurement duty cycle mode comprising a plurality of measurement available intervals and measurement unavailable intervals. For example, the GNSS baseband 106 may wake up during measurement available intervals to process signals received for GNSS measurement. The GNSS baseband 106 may be shut down during the measurement unavailable intervals.

The clock timing control circuit 108 may comprise suitable logic, circuitry and/or code that are operable to maintain clock timing with a reference clock (TCXO) used by the RF front-end 104. The clock timing control circuit 108 may be enabled to capture or count a number of TCXO cycles elapsed for a certain period of time, in which the frequency synthesizer of the RF front-end 104 may be shut down. The clock timing control circuit 108 may provide clock offset accordingly to the GNSS baseband 106 for processing signals received during the measurement available intervals.

The processor 110 may comprise suitable logic, circuitry and/or code that may be enabled to process GNSS baseband signals from the GNSS baseband 106. The processor 110 may be configured to extract navigational information from received GNSS baseband signals to determine navigational information such as a position fix associated the communication device 100.

The memory 112 may comprise suitable logic, circuitry, and/or code that may enable storing of information such as executable instructions and data that may be utilized by the processor 110. The executable instructions may comprise algorithms that may be applied to extract ephemeris from received GNSS broadcast navigation signals and to calculate a navigation solution from the extracted ephemeris. The data may comprise the determined position fix associated with the communication device 100. The memory 112 may comprise RAM, ROM, low latency nonvolatile memory such as flash memory and/or other suitable electronic data storage.

The user interface 114 may comprise suitable logic, circuitry, and/or code that may enable presentation of navigation information. The navigation information may be presented graphically, aurally, in response to user input requests for a navigation update via, for example, a keyboard, a keypad, a thumbwheel, a mouse, touch screen, audio, a trackball and/or other input method.

In operation, the GNSS receiver chip 100a in a measurement duty cycle mode may process GNSS signals received for GNSS measurement during measurement available intervals. The RF front-end 104 may be operable to process GNSS signals received and convert into GNSS baseband signals. The converted GNSS baseband signals may be communicated to the GNSS baseband 106 for GNSS baseband processing. The processed GNSS baseband signals may be forwarded to the processor 110 to be used for determining a position fix, for example. The processor 110 may use an algorithm stored in the memory to calculate the position fix and present it to a user via the user interface 114. The communication device 100 may be one of various GNSS enabled devices such as, for example, a GNSS enabled cellular phone.

Clock information for baseband processing in the GNSS baseband 106 may be provided by the RF front-end 104 during measurement available intervals. In instances where a measurement available interval may be saturated or expired, the GNSS baseband 106 may enter a measurement unavailable interval. During the measurement unavailable interval, the GNSS baseband 106 and some RF components such as the frequency synthesizer may shut down to reduce power consumption. The clock information to the GNSS baseband 106 may then be stopped while keeping TCXO on. The clock timing control circuit 108 may then be activated to capture a number of TCXO cycles elapsed during the GNSS measurement unavailable interval and provide a clock offset to the GNSS baseband 106 for clock recovery during the GNSS measurement available interval.

Figure 2:
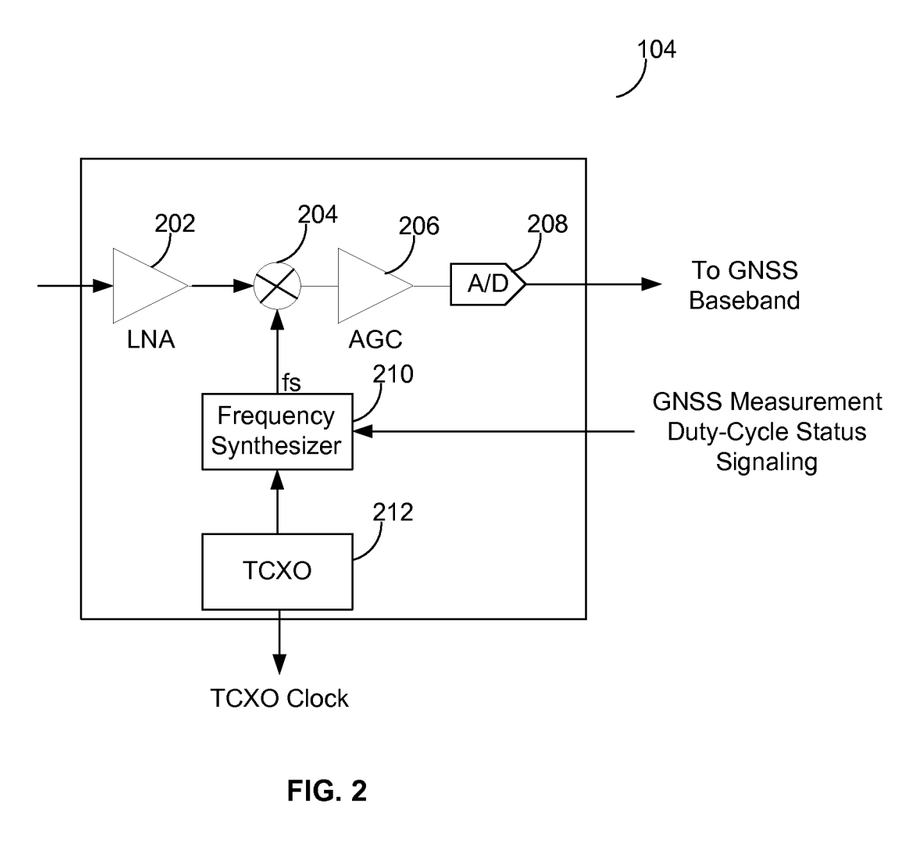
FIG. 2 is a block diagram illustrating an exemplary RF front-end that enables power management for a frequency synthesizer in a GNSS receiver chip, in accordance with an embodiment of the invention, in accordance with an embodiment of the invention.

FIG. 2 is a block diagram illustrating an exemplary RF front-end that enables power management for a frequency synthesizer in a GNSS receiver chip, in accordance with an embodiment of the invention. Referring to FIG. 2, there is shown a RF front-end 104 comprising a low noise amplifier (LNA) 202, a mixer 204, an automatic gain control (AGC) 206, an analog-to-digital conversion (A/D) 208, a frequency synthesizer 210, and a reference clock (TCXO) 212.

The LNA 202 may comprise suitable logic, circuitry and/or code that are operable to amplify signals received by the antenna 102. The LNA 202 may enable low noise performance, which may be utilized for a high performance radio frequency (RF) front end.

The mixers 204 may comprise suitable logic, circuitry and/or code that are operable to multiply the amplified signals from the LNA 202 with signals from the frequency synthesizer 210.

The AGC 206 may comprise suitable logic, circuitry and/or code that are operable to amplify desired spectral portions from the mixer 204.

The A/D 208 may comprise suitable logic, circuitry and/or code that are operable to convert received analog signals from the AGC 206 to a series of digital data (e.g., bytes) having values representative of the signal amplitude.

The frequency synthesizer 210 may comprise suitable logic, circuitry and/or code that are operable to generate local frequencies suitable for receiving information along more than one carrier frequency. The frequency synthesizer 210 may generate required clocks for GNSS baseband processing. The frequency synthesizer 210 may operate as a high frequency oscillator locking to a reference clock generated at the TCXO 212. The frequency synthesizer 210 may be operable to generate required clocks based on the generated reference clock from the TCXO 212. In accordance with various embodiments of the invention, the frequency synthesizer 210 may be configured to operate intermittently based on GNSS measurement duty-cycle. In this regard, the frequency synthesizer 210 may be turned on to generate a required clock for GNSS baseband processing during GNSS measurement available intervals. The frequency synthesizer 210 may be turned off during GNSS measurement unavailable intervals. Accordingly, no clock information may be provided to the GNSS baseband 106 from the frequency synthesizer 210 during GNSS measurement unavailable intervals.

The TCXO 212 may comprise suitable logic, circuitry and/or code that are operable to generate a reference clock utilized by the frequency synthesizer 210.

In operation, satellite signals received at the antenna 102 may be amplified via the LNA 202. The output of the LNA 202 may then be mixed with signals with a required frequency from the frequency synthesizer 210. The required frequency is generated locally by the frequency synthesizer 210 based on a reference clock generated by the TCXO 212. The mixed signals may be adjusted via the AGC 206 and may be presented with approximately equal signal power to A/D 208. The A/D 208 may be operable to convert the received signals to corresponding GNSS baseband digital signals and communicate with the GNSS baseband 106 for GNSS baseband processing. The frequency synthesizer 210 may be tuned on or off based on the operational status of the GNSS baseband 106 within a measurement duty cycle.

Figure 3:
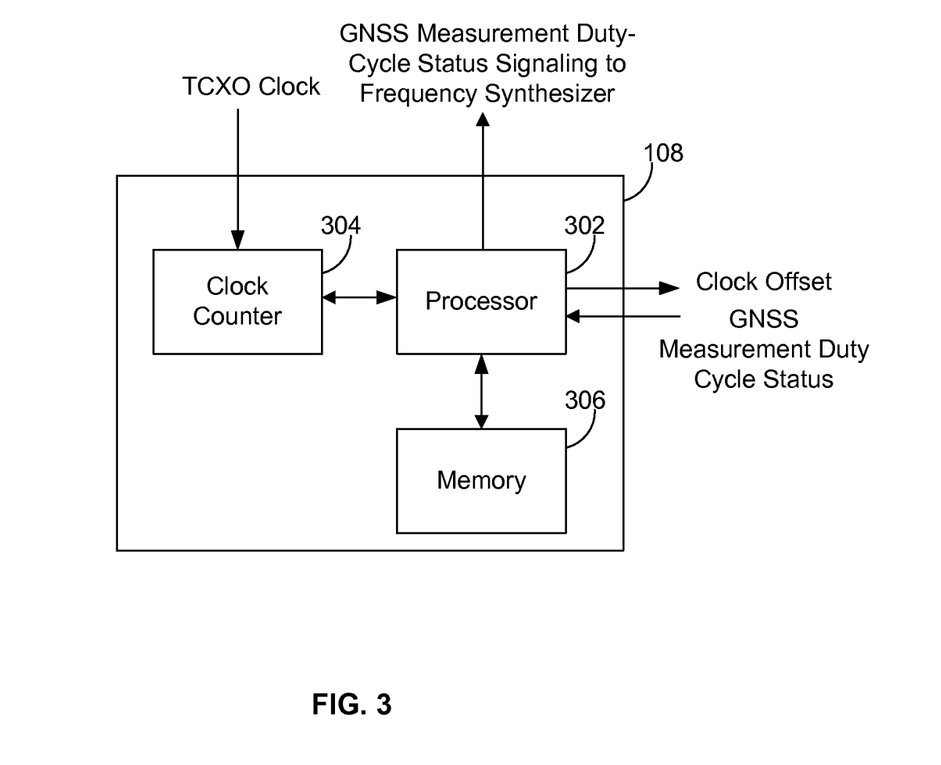
FIG. 3 is a block diagram illustrating an exemplary clock timing control circuit that may be used in a communication device for power management for a frequency synthesizer in a GNSS receiver chip, in accordance with an embodiment of the invention, in accordance with an embodiment of the invention.

FIG. 3 is a block diagram illustrating an exemplary clock timing control block that may be used in a communication device for power management for a frequency synthesizer in a GNSS receiver chip, in accordance with an embodiment of the invention. Referring to FIG. 3, there is shown a clock timing control circuit 108 comprising a processor 302, a clock counter 304, and a memory 306.

The processor 302 may comprise suitable logic, circuitry and/or code that are operable to maintain clock timing for GNSS baseband processing in the GNSS baseband 106. The processor 302 may be operable to provide an indication of whether the frequency synthesizer 210 is to be on or off based on the operation status of the GNSS baseband 106 within a measurement duty cycle. In this regard, the GNSS baseband 106 in GNSS measurement available intervals may indicate that the frequency synthesizer 210 may be turned on to generate clock information to the GNSS baseband 106. The GNSS baseband 106 in GNSS measurement unavailable intervals may indicate that the frequency synthesizer 210 may be turned off. No clock information may be provided to the GNSS baseband 106 during GNSS measurement unavailable intervals. In this regard, the processor 302 may be operable to activate the clock counter 304 to capture or count number of TCXO cycles elapsed corresponding to each GNSS measurement unavailable interval. The processor 302 may be operable to transfer the captured or counted number of TCXO cycles elapsed within each GNSS measurement unavailable interval to a clock offset. The clock offset may be provided to the GNSS baseband 106 for clock recovery during GNSS measurement available intervals. The processor 302 may be operable to deactivate the clock counter 304 during GNSS measurement available intervals.

The clock counter 304 may comprise suitable logic, circuitry and/or code that are operable to capture or count a number of TCXO cycles elapsed for a certain time period. The clock counter 304 may be activated or deactivated accordingly by the processor 302 based on the operational status of the GNSS baseband 106 within the measurement duty cycle. The clock counter 304 may be enabled to count the number of TCXO cycles elapsed for each GNSS measurement unavailable interval and provide to the processor 302 for calculating corresponding clock offset.

The memory 306 may comprise suitable logic, circuitry, and/or code that may enable storing of information such as executable instructions and data that may be utilized by the processor 302. The executable instructions may comprise algorithms that may be applied to update clock timing information based on captured TCXO cycles elapsed from the clock counter 304. The data may comprise clock offset values, for example. The memory 308 may comprise RAM, ROM, low latency nonvolatile memory such as flash memory and/or other suitable electronic data storage.

In operation, the clock timing control circuit 108 may be operated in responsive to an operation status change of the GNSS baseband 106 within a measurement duty cycle. In instances where the processor 302 may be indicated that the GNSS baseband 106 may be entering a GNSS measurement unavailable interval, the processor 302 may signal the frequency synthesizer 210 to shut off and activate the clock counter 304, simultaneously. The clock counter 304 may start counting number of TCXO cycles elapsed. In the event that the processor 302 indicates that the GNSS baseband 106 may be entering a GNSS measurement available interval, the processor 302 may signal the frequency synthesizer 210 to turn on and generate a required clock to the GNSS baseband 106. The processor 302 may get the counted number of TCXO cycles elapsed from the clock counter 304 and deactivate the clock counter 304. The processor 302 may be enabled to transfer the counted number of TCXO cycles elapsed to a clock offset by using algorithms stored in the memory 306. The clock offset may be provided to the GNSS baseband 106 used for processing signals received during the GNSS measurement available interval.

Figure 4:
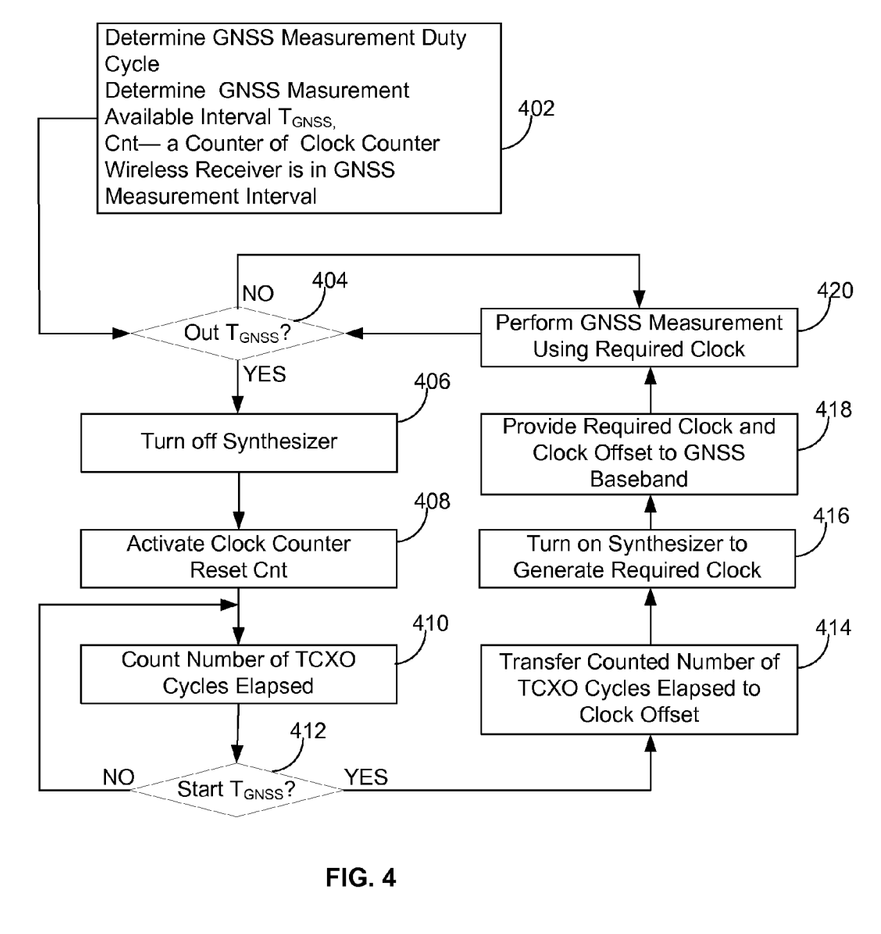
FIG. 4 is a flow chart illustrating exemplary steps for power management for a frequency synthesizer in a GNSS receiver chip, in accordance with an embodiment of the invention, in accordance with an embodiment of the invention.

FIG. 4 is a flow chart illustrating exemplary steps for power management for a frequency synthesizer in a GNSS receiver chip, in accordance with an embodiment of the invention, in accordance with an embodiment of the invention. Referring to FIG. 4, the exemplary steps begin with step 402, where a GNSS measurement duty cycle and a GNSS measurement available interval $T_{GNSS}$ may be determined for the GNSS receiver chip 100a in the communication device 100. The GNSS receiver chip 100a may be currently making GNSS measurement within a $T_{GNSS}$. In step 404, it may be determined whether $T_{GNSS}$ may be saturated or expired. In instances where $T_{GNSS}$ may not be saturated or expired, then in step 420, the GNSS receiver chip 100a may process signals received for GNSS measurement using a required clock provided by the frequency synthesizer 210 to the GNSS baseband 106. In step 404, in instances where $T_{GNSS}$ may be saturated or expired, then in step 406, the clock timing control circuit 108 may provide an indication to the frequency synthesizer 210 to turn off while keeping the TCXO 212 on. In step 408, the clock counter 304 may be activated via the processor 302 and reset counter of the clock counter 304. In step 410, the clock counter 304 may be enabled to capture or count number of elapsed TCXC cycles. In step 412, it may be determined whether the GNSS baseband 106 may start with a GNSS measurement available interval $T_{GNSS}$.

In instances where the GNSS baseband 106 may be enabled to start with a GNSS measurement available interval $T_{GNSS}$, then in step 414, where the processor 302 may be enabled to transfer the captured or counted number of TCXO cycles elapsed to a clock offset. In step 416, the processor 302 may signal the frequency synthesizer 210 to turn on so as to generate the required clock. In step 418, the GNSS baseband 106 may be provided with the required clock that is generated from the frequency synthesizer 210 and the clock offset from the clock timing control circuit 108. The exemplary process may continue in step 420 for processing signals received for GNSS measurement using required clock from the frequency synthesizer 210 with clock timing provided by the clock timing control circuit 108. In step 412, in instances where the GNSS baseband 106 may not be enabled to start with a GNSS measurement available interval $T_{GNSS}$, then the exemplary process returns to step 410 to continue capturing or counting number of TCXC cycles elapsed.

Aspects of a method and system for power management for a frequency synthesizer in a GNSS receiver chip are provided. Various embodiments of the invention may comprise duty cycling operation of a frequency synthesizer 210 within a GNSS RF front-end 104 of a GNSS receiver chip 110a, wherein the frequency synthesizer 210 is cycled on to generate required clock signals and cycled off during a measurement duty cycle. The GNSS receiver chip 110a may be located within the communication device 100.

The frequency synthesizer 210 may be used to generate a required clock for the GNSS receiver chip 110a. The measurement duty-cycle may be characterized by a plurality of measurement available intervals and a plurality of measurement unavailable intervals, respectively. The TCXO 212 may generate a reference clock and may be inputted to the frequency synthesizer 210. The TCXO 212 may keep the reference clock on during the measurement duty-cycle. The frequency synthesizer 210 may be cycled on to generate the required clock to the GNSS baseband 106 during the plurality of measurement available intervals. The required clock may be generated based on the reference clock from the TCXO 212. The RF front-end 104 and the GNSS baseband 106 may process signals received using the required clock during the plurality of measurement available intervals. The frequency synthesizer 210 may be cycled off during the plurality of measurement unavailable intervals and no required clock may be provided to the GNSS baseband 106 for the same time period. During the plurality of measurement unavailable intervals, the clock timing control circuit 108 may be enabled to maintain clock timing of the required clock based on the reference clock from the TCXO 212.

The clock counter 304 may be enabled to capture or count number of elapsed clock cycles of the reference clock for a measurement unavailable interval of the measurement duty cycle. The processor 302 of the clock timing control circuit 108 may be operable to transfer the captured or counted number of elapsed clock cycles of the reference clock to a clock offset. When the frequency synthesizer 210 may be turned back on in a following measurement available interval of said measurement duty cycle, the GNSS baseband 106 may process signals received using the required clock generated by the frequency synthesizer 210 and the clock offset from the clock timing control circuit 108, accordingly.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for power management for a frequency synthesizer in a GNSS receiver chip.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for communication, the method comprising:
receiving a first indication that a frequency synthesizer should be on based on a determination that a GNSS receiver chip is in a first measurement available interval of a measurement duty cycle;
cycling the frequency synthesizer on within the GNSS receiver chip to generate required clock signals for the GNSS receiver chip in response to the received first indication, wherein the GNSS receiver chip is configured to receive function requests during the first measurement available interval;
receiving a second indication that the GNSS receiver chip has entered a measurement unavailable interval based on a determination that the first measurement available interval has expired;

cycling the frequency synthesizer off in response to the received second indication, wherein the GNSS receiver chip is configured to receive no function request during the measurement unavailable interval;

generating one or more signals in the GNSS receiver chip to concurrently cycle off the frequency synthesizer and activate a counter in the GNSS receiver chip to capture a number of clock cycles of a reference clock during the off cycle; and transferring the captured number of clock cycles to a clock offset upon entering a second measurement available interval, wherein the frequency synthesizer is in a low-power state while cycled off.

2. The method according to claim 1, wherein the measurement duty cycle comprises a plurality of measurement available intervals and a plurality of measurement unavailable intervals.

3. The method according to claim 2, wherein a reference clock signal is received by the frequency synthesizer during the measurement duty cycle.

4. The method according to claim 3, comprising cycling on the frequency synthesizer to generate the required clock signals based on the reference clock during the plurality of measurement available intervals.

5. The method according to claim 4, comprising processing signals received by a wireless receiver using the required clock signal during the plurality of measurement available intervals.

6. The method according to claim 3, comprising cycling off the frequency synthesizer inside the GNSS receiver chip during the plurality of measurement unavailable intervals.

7. The method according to claim 6, comprising maintaining clock timing of the required clock signals based on the reference clock during the plurality of measurement unavailable intervals.

8. The method according to claim 7, comprising enabling capturing a number of elapsed clock cycles of the reference clock for a measurement unavailable interval of the measurement duty cycle concurrently with a start of the measurement unavailable interval of the measurement duty cycle.

9. The method according to claim 8, comprising transferring the captured number of elapsed clock cycles of the reference clock fbr the measurement unavailable interval of the measurement duty cycle to a clock offset.

10. The method of claim 1, further comprising:
providing a GNSS baseband with the required clock signal generated by the frequency synthesizer and the clock offset during the second measurement available interval.

11. The method of claim 10, further comprising processing signals received for GNSS measurement during the second measurement available interval using the required clock signal generated by the frequency synthesizer, wherein the frequency synthesizer has clock timing provided by a clock timing control circuit comprising the clock offset.

12. A system for communication, comprising:
one or more circuits in a GNSS receiver chip, the one or more circuits comprising a counter and a frequency synthesizer;
the one or more circuits being configured to:
receive a first indication that a frequency synthesizer should be on based on a determination that a GNSS receiver chip is in a first measurement available interval of a measurement duty cycle;
cycle the frequency synthesizer on to generate required clock signals for at least the GNSS receiver chip in response to the received first indication, wherein the GNSS receiver chip is configured to receive function requests during the first measurement available interval;

receive a second indication that the GNSS receiver chip has entered a measurement unavailable interval based on a determination that the first measurement available interval has expired;

cycle the frequency synthesizer off in response to the received second indication, wherein the GNSS receiver chip is configured to receive no function request during the measurement unavailable interval;

generate one or more signals to concurrently cycle off the frequency synthesizer and activate the counter to capture a number of clock cycles of a reference clock during the off cycle; and transfer the captured number of clock cycles to a clock offset upon entering a second measurement available interval, wherein the frequency synthesizer is in a tow-power state while cycled off.

13. The system according to claim 12, wherein the measurement duty cycle comprises a plurality of measurement available intervals and a plurality of measurement unavailable intervals.

14. The system according to claim 13, wherein a reference clock inputted to the frequency synthesizer is on during an entire measurement duty cycle.

15. The system according to claim 14, wherein the one or more circuits are configured to cycle on the frequency synthesizer inside a wireless receiver to generate the required clock signals based on the reference clock during the plurality of measurement available intervals.

16. The system according to claim 15, wherein the one or more circuits are configured to process signals received by the wireless receiver using the required clock during the plurality of measurement available intervals.

17. The system according to claim 14, wherein the one or more circuits are configured to cycle off the frequency synthesizer inside the GNSS receiver chip during the plurality of measurement unavailable intervals.

18. The system according to claim 17, wherein the one or more circuits are configured to maintain clock timing of the required clock signals based on the reference clock during the plurality of measurement unavailable intervals.

19. The system according to claim 18, wherein the one or more circuits are configured to enable capture of a number of elapsed clock cycles of the reference clock for a measurement unavailable interval of the measurement duty cycle concurrently with a start of the measurement unavailable interval of the measurement duty cycle.

20. The system according to claim 19, wherein the one or more circuits are configured to transfer the captured number of elapsed clock cycles of the reference clock for the measurement unavailable interval of the measurement duty cycle to a clock offset.

21. The system according to claim 20, wherein
the one or more circuits are configured to cycle on the frequency synthesizer to generate the required clock signals in a measurement available interval immediately following the measurement unavailable interval of the measurement duty cycle; and
the one or more circuits are configured to process signals received by the GNSS receiver chip using the required clock signals with the clock offset.

22. A system for communication, comprising:
a GNSS receiver chip comprising a frequency synthesizer and a timing controller with a counter;

wherein the timing controller is configured to provide an indication of whether the frequency synthesizer is to be on or off based on an operation status of the GNSS receiver within a measurement duty cycle;

wherein the GNSS receiver chip is configured to cycle the operation of the frequency synthesizer on to generate clock signals for GNSS measurements when the indication is that the GNSS receiver is in a first measurement available interval of a measurement duty cycle, wherein the GNSS receiver chip is configured to receive a function request during the first measurement available interval;

wherein the GNSS receiver chip is configured to cycle the operation of the frequency synthesizer off when the indication is that the GNSS receiver is in a measurement unavailable interval of a measurement duty cycle, wherein the GNSS receiver chip is configured to receive no function requests during the measurement unavailable interval;

wherein the GNSS receiver chip is configured to generate one or more signals to concurrently turn off the frequency synthesizer and activate the counter to capture a number of clock cycles of a reference clock during the off cycle; and wherein the GNSS receiver chip is configured to transfer the captured number of dock cycles to a clock offset upon entering a second measurement available interval, wherein the frequency synthesizer is in a low-power state while cycled off.

* * * * *

UNITED STATES PATENT AND TRADEMARK OFFICE
CERTIFICATE OF CORRECTION

| | | |
|---|---|---|
| PATENT NO. | : 9,322,924 B2 | Page 1 of 1 |
| APPLICATION NO. | : 12/352346 | |
| DATED | : April 26, 2016 | |
| INVENTOR(S) | : Charles Abraham | |

It is certified that error appears in the above-identified patent and that said Letters Patent is hereby corrected as shown below:

In the Claims

In column 10, line 19, please replace "tow-power state" with --low-power state--.

In column 11, line 26, please replace "dock cycles" with --clock cycles--.

Signed and Sealed this
Fifth Day of July, 2016

Michelle K. Lee
*Director of the United States Patent and Trademark Office*